United States Patent
Fujiwara et al.

(10) Patent No.: US 6,448,715 B1
(45) Date of Patent: Sep. 10, 2002

(54) PROJECTION DISPLAY APPARATUS

(75) Inventors: Shuichi Fujiwara, Nagano; Shoichi Akaiwa, Matsumoto, both of (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 09/403,721
(22) PCT Filed: Feb. 24, 1999
(86) PCT No.: PCT/JP99/00862
§ 371 (c)(1), (2), (4) Date: Dec. 9, 1999
(87) PCT Pub. No.: WO99/44097
PCT Pub. Date: Sep. 2, 1999

(30) Foreign Application Priority Data

Feb. 26, 1998 (JP) .......................................... 10-046044

(51) Int. Cl.[7] .............................................. H05B 37/04
(52) U.S. Cl. ........................ 315/129; 315/119; 340/540
(58) Field of Search ................................. 315/129, 132, 315/133, 136, 119, 74, 360, 362; 340/641, 635, 500, 638

(56) References Cited

U.S. PATENT DOCUMENTS

| 5,880,563 A | * | 3/1999 | Toyama et al. | 315/129 |
| 6,153,987 A | * | 11/2000 | Toda et al. | 315/308 |
| 6,268,799 B1 | * | 7/2001 | Miyashita et al. | 340/641 |

FOREIGN PATENT DOCUMENTS

| EP | 0 833 548 A1 | 4/1998 |
| JP | U-1-160696 | 11/1989 |
| JP | U-3-80481 | 8/1991 |
| JP | A-9-320781 | 12/1997 |
| WO | WO 97/38560 | 10/1997 |

OTHER PUBLICATIONS

"Electronic Display", Ohm Co., Ltd., p. 291, line 14—p. 294,line 6, published Jul. 7, 1995 and an English–language translation thereof.

* cited by examiner

Primary Examiner—Haissa Philogene
Assistant Examiner—Ephrem Alemu
(74) Attorney, Agent, or Firm—Oliff & Berridge, PLC

(57) ABSTRACT

A projection display apparatus is provided which forms an optical image corresponding to image information by optically processing a light beam emitted from a light source lamp and projects this optical image with a projection lens unit on a projection screen under magnification. The projection display apparatus may include a lighting count detector that detects a lighting count of the light source lamp, and a replacement warning unit that outputs a warning signal, which urges a user to replace the light source lamp, in case where the lighting count detected by the lighting count detector reaches a predetermined value, making it possible to more accurately determine the lifetime of the light source lamp by detecting the lighting count which affects the lifetime of the light source lamp.

20 Claims, 7 Drawing Sheets

| | 120W | 180W | 1500 TIMES | 2000 TIMES | 1500 H | 2000 H |
|---|---|---|---|---|---|---|
| B1 | ON 1 | OFF 0 | — | — | — | — |
| B2 | — | — | ON 1 | OFF 0 | — | — |
| B3 | — | — | — | — | ON 1 | OFF 0 |

REPLACE THE PROJECTION LAMP

FIG. 6

| FREQUENCY | H : 123. 45 kHz |
| --- | --- |
| | V : 123. 4 Hz |
| SYNC POLARITY | H : Negative |
| | V : Positive |
| SYNC MODE | : Separate |
| DETECTED COMP MODE | : SVGA 72 |
| LAMP OPERATION TIME | : 1234 Hours |
| LAMP REPLACEMENT | : 3 Times |
| LAMP ON/OFF | : 120 Times |

FIG. 7

| | |
|---|---|
| DETECTED COMP MODE | : NTSC |
| LAMP OPERATION TIME | : 1234 Hours |
| LAMP REPLACEMENT | : 3 Times |
| LAMP ON/OFF | : 120 Times |

FIG. 8

PROJECTION DISPLAY APPARATUS

BACKGROUND OF THE INVENTION

1. Field of the Invention

The present invention relates to a projection display apparatus that forms an optical image corresponding to image information by optically processing a light beam emitted from a light source lamp and projects this optical image with a projection lens unit on a projection screen under magnification.

2. Description of Related Art

Until now, a projection display apparatus is well known, the projection display apparatus which comprises an optical unit that forms an optical image corresponding to image information by optically processing a light beam emitted from a light source lamp and projects this optical image with a projection lens unit on a projection screen under magnification, a power supply unit supplying power to this optical unit and the light source lamp, an outer case containing the optical unit and the power supply unit, and a plurality of circuit boards for controlling the optical unit.

According to this type of projection display apparatus, it is possible to project an image in a computer and the like on a projection screen under magnification. Therefore, it is possible to effectively perform multimedia presentation using a computer and the like.

A metal halide lamp, a xenon lamp, a high-pressure mercury-vapor lamp, and the like are used as the light source lamps in projection display apparatuses. Although these light source lamps can emit comparatively stable light for some thousands hours from operation start, lifetime of the lamps expires when the lamps are used for more than the hours, brightness of the lamps remarkably drops, and the light source lamps may burst.

Therefore, in a conventional projection display apparatus, a lifetime value of operation time of a light source lamp is set according to a kind of the light source lamp. Furthermore, a mechanism, extinguishing the light source lamp when the accumulated operation time of the light source lamp built in the projection display apparatus reaches this lifetime value, is provided. Owing to this, the above-described problems of burst of the light source lamp and the like are treated.

Nevertheless, there are following problems in this type of conventional projection display apparatus.

① Thus, the lifetime of a light source lamp is not determined by only its accumulated operation time, but, for example, a lighting count of the light source lamp also affects the lifetime of the light source lamp since the light source lamp is loaded at the time of turning on. Therefore, there arises a problem that the light source lamp reaches its lifetime before the light source lamp reaches a lifetime value set in regard to its operation time.

② In addition, since the light source lamp is gradually weary with its operation time increasing, the brightness of the light source lamp is apt to gradually decrease before the light source lamp reaches its lifetime value. Therefore, it is not preferable to suddenly extinguish the light source lamp at the time of the accumulated operation time reaching its lifetime value. Alternatively, it is preferable that a user knows information such as the accumulated operation time of the light source lamp beforehand and replaces the light source lamp according to states.

An object of the present invention is to provide a projection display apparatus that forms an optical image corresponding to image information by optically processing a light beam emitted from a light source lamp and projects this optical image with a projection lens unit on a projection screen under magnification, and that can always turn on the light source lamp in a proper state.

SUMMARY OF THE INVENTION

In order to achieve the object, a projection display apparatus according to the present invention is a projection display apparatus that forms an optical image corresponding to image information by optically processing a light beam emitted from a light source lamp and projects this optical image with a projection lens unit on a projection screen under magnification. This projection display apparatus may include a lighting count detector that detects a lighting count of the light source lamp, replacement warning unit that outputs a warning signal, which urges a user to replace the light source lamp, in case where the lighting count detected by this lighting count detection reaches a predetermined value, and a display unit that displays the lighting count and/or the warning signal.

Here, the predetermined value at which the replacement warning unit outputs the warning signal can be set according to a lifetime value set for the light source lamp. For example, if the lifetime value of the lighting count of the light source lamp is set at 2000 times, the predetermined value can be set at 1900 times.

In addition, as the display unit, various types of devices such as a projected image from a projection display apparatus, an indicator such as an LED that is provided in a projection display apparatus, a display of a computer connected to a projection display apparatus, and the like can be used.

According to the present invention like this, since the projection display apparatus comprises the lighting count detection means, it is possible to further accurately grasp the actual lifetime of the light source lamp built in the projection display apparatus by detecting the lighting count affecting the lifetime of the light source lamp. Hence, it is possible to use the light source lamp in an always proper state. Furthermore, since the projection display apparatus comprises the replacement warning unit, it is possible to replace the light source lamp before the forcible extinguishing unit operates because of the operation time of the light source lamp reaching its lifetime value. Moreover, similarly, it is possible to use the light source lamp in the always proper state without the brightness of the light source lamp extremely dropping in use.

In the above configuration, it is preferable that the above-described projection display apparatus comprises lighting inhibition means that inhibits the lighting of the light source lamp in case where the lighting count reaches a lifetime value set for the light source lamp, and a lifetime warning unit that outputs on the display unit a warning signal of giving a warning that the light source lamp reaches its lifetime value.

Here, as the display unit means on which the lifetime warning unit outputs the warning signal, an indicator such as an LED provided in the projection display apparatus or a display of a computer connected to the projection display apparatus is preferable. This is because a projected image of the projection display apparatus is not displayed by the lighting inhibitor.

Thus, since the projection display apparatus comprises the lighting inhibitor lighting of the light source lamp is inhibited by the lighting inhibitor even if the light source lamp reaches its lifetime thereafter when the light source lamp was not replaced at the time of the replacement warning signal was displayed. Therefore, it is possible to prevent the light source lamp from bursting and so forth.

In addition, it is preferable that the above-described projection display apparatus comprises an operation time detector time that detects the operation time of the light source lamp, and that the replacement warning unit is constructed so that the replacement warning unit issues the above-described warning signal in case where any one of the lighting count and operation time reaches a predetermined value.

Thus, since the replacement warning unit is constructed in this manner, it is possible to judge the replacement timing of the light source lamp from the state of the lighting count and operation time, and to use the light source lamp in the further proper state.

Furthermore, it is preferable that the above-described projection display apparatus comprises a forcible extinguishing unit that forcibly extinguishes the light source lamp in case where the operation time detected by the operation time detector reaches the lifetime value set for the light source lamp.

Thus, since the projection display apparatus comprises the forcible extinguishing unit it is possible to prevent the light source lamp from bursting and so forth since the light source lamp is forcibly extinguished by the forcible extinguishing unit in case where the operation time of the light source lamp reaches the lifetime value in lighting.

Further, it is preferable that the above-described display unit is an image display unit for constructing the projection display apparatus.

Thus, since the display unit that displays the warning signal is the image display unit it is possible to grasp the information of the light source lamp such as the lighting count and operation time as actual values on a screen. Furthermore, since it is possible to use the projection display apparatus with a user confirming the state of the light source lamp, it is possible to use the light source lamp in the further proper state.

In addition, it is preferable that the above-described lighting count detector comprises a lighting count recorder recording the lighting count and this lighting count recorder is composed of nonvolatile memory that does not lose the recorded information even if the power of the projection display apparatus is shut off.

Here, as the nonvolatile memory, it is preferable that memory in which the recorded information can be written and cleared is adopted, and, for example, E²PROM (Erasable Programmable Read Only memory), or E²PROM (Electrically Erasable Programmable Read Only memory) can be adopted. In addition, it is preferable that a partial area of this nonvolatile memory is used as an operation time recorder recording the operation time.

Thus, since the lighting count recorder is composed of the nonvolatile memory, it is possible to hold the record of the lighting count of the light source lamp even if the power of the projection display apparatus is shut off.

BRIEF DESCRIPTION OF THE DRAWINGS

FIG. 6 is a drawing showing a display screen of image display means on the basis of a replacement warning signal in the embodiment.

FIG. 7 is a drawing showing a display screen of image display means for displaying the lighting count and operation time of the light source lamp in the embodiment.

FIG. 8 is a drawing, corresponding to FIG. 7, at the time of an image signal, which is different from an image signal input in the embodiment, being input.

Figure 1:
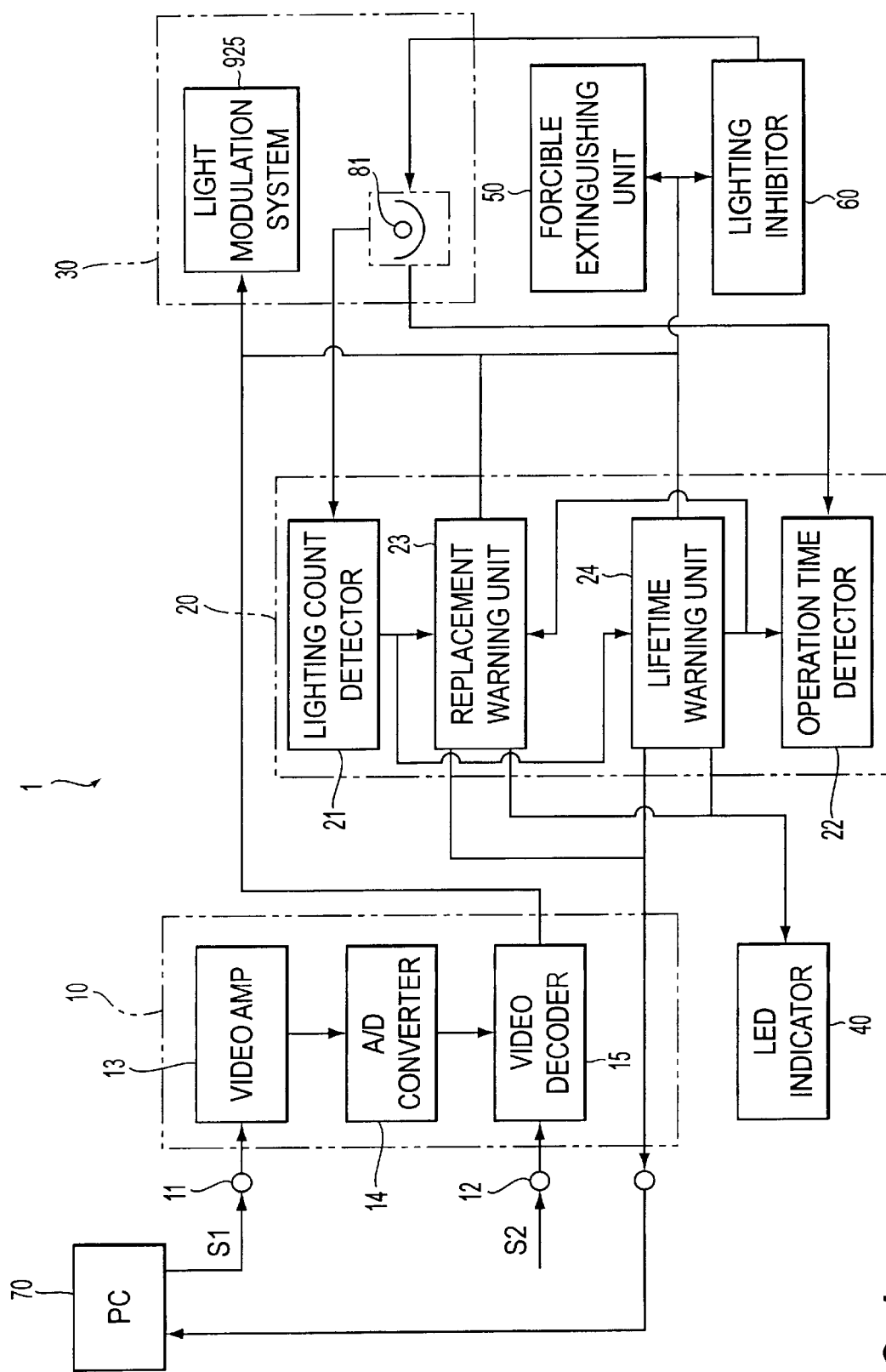
FIG. 1 is a block diagram showing the structure of a projection display apparatus according to an embodiment of the present invention.

In drawings, each reference numeral shows the following article.

DESCRIPTION OF THE PREFERRED EMBODIMENTS

An embodiment of the present invention that is shown in drawings will be described in greater detail with reference to the embodiment shown in drawings.

A projection display apparatus 1 according to this embodiment is shown in FIG. 1. This projection display apparatus 1 comprises image input means (image in put unit) 10 where image signals S1 and S2 are input, lamp information detection means (lamp information dector) 20 that detects the operation time and lighting count of a light source lamp 81, and image display means (image display unit) 30 that forms an optical image on the basis of the image signals S1 and S2 that are input from the image input means 10 and projects the optical image under magnification. In addition, this projection display apparatus 1 has an LED indicator 40 that is provided in an outer case not shown and glows in green, red, or the like according to the operation time and lighting count of the light source lamp 81, forcible extinguishing means (forcible Extinquishing unit) 50 that prevents the light source lamp 81 from bursting by shutting off the light source lamp 81 in case where the lifetime of the operation time expires in use of the light source lamp 81, and lighting inhibition means lighting inhibitor 60 that inhibits the lighting of the light source lamp 81 in case where the lifetime of the lighting count expires at the time of turning on the light source lamp 81. In addition, the forcible extinguishing means 50 and lighting inhibition means 60 are composed of well-known circuits that can shut off power supply to the light source lamp 81 according to signal inputs.

The image input means 10 is composed of including an RGB input terminal 11 receiving the image signal S1 output from a computer 70, a video input terminal 12 where the composite signal S2 output from a video camera and the like that are not shown, a video amp 13 amplifying the RGB signal S1 input from the RGB input terminal 11, an A/D converter 14 performing A/D conversion of the RGB signal S1 amplified, and a video decoder 15 that decodes the composite signal S2 and performs YUV-TO-RGB conversion. The image input means 10 is constructed so that the image signal S1 input from the computer 70 may be converted into a digital signal by the video amp 13 and A/D converter 14, and the image input means 10 may output the image signal S1 to an optical modulation system 925 constructing the image display means 30. On the other hand, the image input means 10 is constructed so that the composite signal S2 may be converted into a digital RGB signal by the video decoder 15 and, similarly to the above, the image input means 10 may signal-output the digital RGB signal to the optical modulation system 925. In addition, well-known circuits to output signals suitable to the image display means 30 having the dot-matrix type optical modulation system 925 are used for the video amp 13, A/D converter 14, and video decoder 15.

The lamp information detection means 20 comprises lighting count detection means (lighting count detester) 21, operation time detection means (operationtime detection) 22, replacement warning means (replacement ucirning unit) 23, and lifetime warning means (lifetime warning unit) 24, and judges a state of the light source lamp 81 to a lifetime value set for the light source lamp 81 by detecting the lighting count and operation time of the light source lamp 81.

The lighting inhibition means 21 not only detects the lighting count of the light source lamp 81, but also detects the lifetime value that is set for the light source lamp unit 8 and is described later, and outputs this lifetime value and a replacement threshold calculated on the basis of the lifetime value to the replacement warning means 23 and lifetime warning means 24. Similarly, the operation time detection means 22 also not only detects the operation time of the light source lamp 81, but also detects the lifetime value set for the light source lamp unit 8, and outputs this lifetime value and a replacement threshold calculated on the basis of the lifetime value to the replacement warning means 23 and lifetime warning means 24.

Although these are omitted in FIG. 1, the lighting count detection means 21 and operation time detection means 22 comprise a lighting count recorder and an operation time recorder for accumulating and recording the lighting count and operation time of the light source lamp 81, these are formed by partitioning an area of E²PROM. In addition, since the E²PROM is nonvolatile memory, information recorded is not lost even if the power of the projection display apparatus is shut off. Nevertheless, these means are constructed so that the information recorded may be cleared if the light source lamp unit 8 is replaced.

Although these are omitted in FIG. 1, the replacement warning means 23 comprises a judging unit judging whether the information such as the lighting count and operation time that are detected reaches each replacement threshold, and a signal output unit outputting a replacement warning signal to the image display means 30, LED indicator 40, and computer 70. Similarly to the replacement warning means 23, the lifetime warning means 24 also comprises a judging unit and a signal output unit, but, the lifetime warning means 24 is constructed so that, if the lighting count detected reaches the lifetime value, the lifetime warning means 24 may output a lifetime warning signal to the lighting inhibition means 60, and, if the operation time detected reaches the lifetime value, the lifetime warning means 24 may output a lifetime warning signal to the forcible extinguishing means 50.

Figure 2:
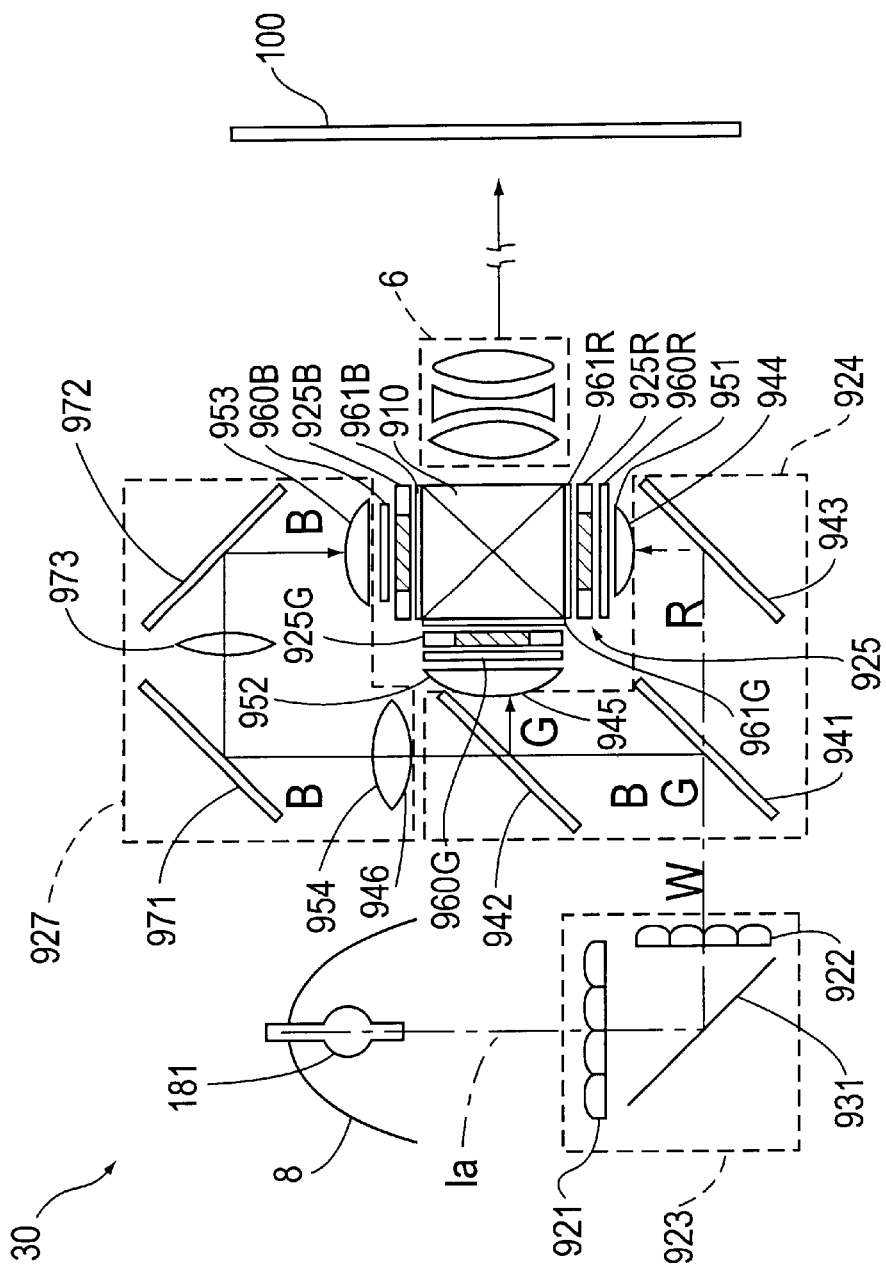
FIG. 2 is a schematic diagram showing the optical structure of image display means in the embodiment.

The image display means 30 is composed of an optical modulation system 925 (described later) modulating a light beam, emitted from the light source lamp, according to an image signal, and a projection type optical system, which projects the modulated light beam, modulated by this optical modulation system 925, on a projection screen under magnification. The image display means 30, as shown in FIG. 2, is composed of including a light source lamp unit 8, an illumination optical system 923 uniformity the in-plane luminance distribution of the light beam W from a light source lamp unit 8, a color separation optical system 924 separating the light beam W from this illumination optical system 923 into red R, green G, and blue B, the optical modulation system 925 modulating respective color light beams R, G, and B according to image information, and a prism unit 910 that is a color mixing optical system and mixes respective color light beams after modulation.

The illumination optical system 923 comprises a reflector 931 deflecting an optical axis 1a of the light beam W emitted from the light source lamp unit 8, and a first lens plate 921 and a second lens plate 922 that are located with sandwiching this reflector 931

The first lens plate 921 has a plurality of rectangular lenses located in a matrix state, divides a light beam emitted from a light source into a plurality of partial light beams, and converges respective partial light beams in the vicinity of the second lens plate 922.

The second lens plate 922 has a plurality of rectangular lenses located in a matrix state, and has a function of superimposing respective partial light beams emitted from the first lens plate 921 on light valves 925R, 925G, and 925B (described later) constructing the optical modulation system 925.

In this manner, the projection display apparatus 1 according to this embodiment can illuminate the liquid crystal light valves 925R, 925G, and 925B with light having almost uniform luminance by the illumination optical system 923. Therefore, it is possible to obtain a projection image not having nonuniformity of luminance.

The color separation system 924 is composed of a blue and green reflection dichroic mirror 941, a green reflection dichroic mirror 942, and a reflector 943. First, a blue light beam B and a green light beam G that are included in the light beam W emitted from the illumination optical system 923 are reflected by the blue and green reflection dichroic mirror 941, and head toward the green reflection dichroic mirror 942.

A red light beam R passes through this blue and green reflection dichroic mirror 941, and is reflected by the reflector 943 thereafter to be emitted from an outgoing part 944 toward the prism unit 910. Next, the green light beam G between the blue light beam B and green light beam G that are reflected by the blue and green reflection dichroic mirror 941 is reflected by the green reflection dichroic mirror 942, and is emitted from an outgoing part 945 of the green light beam G toward the color mixing optical system. The blue light beam B passing through this green reflection dichroic mirror 942 is emitted from an outgoing part 946 of the blue light beam B toward a light guide system 927. In this example, lengths from an outgoing part of the light beam W in the illumination optical system 923 to the outgoing parts 944, 945 and 946 of respective color light beams in the color separation system 924 are set to be equal to each other.

Respective condenser lenses 951 and 952 are located in outgoing sides of the outgoing parts 944 and 945 of the red and green light beams R and G in the color separation system 924. Therefore, the red and green light beams R and G outgoing from respective outgoing parts enter into condenser lenses 951 and 952 to be paralleled.

The red and green light beams R and G, which are paralleled in this manner, pass through incident polarizing plates 960R and 960G, and enters into the liquid crystal light valves 925R and 925G to be modulated. On the other hand, the blue light beam B is guided to the liquid crystal light valve 925B corresponding to the blue light beam B through the light guide system 927 to be modulated similarly.

The liquid crystal light valves 925R, 925G, and 925B are active matrix liquid crystal panels using polycrystal Si-TFTs as switching elements, and, comprise data drivers and scan drivers so as to drive pixels of respective liquid crystal light valves 925R, 925G, and 925B although these drivers are omitted in FIG. 2.

The light guide system 927 comprises a condenser lens 954 located in the outgoing side of the outgoing part 946 of the blue light beam B, an incident reflector 971, an outgoing reflector 972, an intermediate lens 973 located between these reflectors, and a condenser lens 953 located before the liquid crystal light valve 925B. Therefore, the blue light beam B outgoing from the condenser lens 953 passes through the incident polarizing plate 960B, and enters into the liquid crystal light valve 925B to be modulated. Regarding optical path lengths of respective color light beams, that is, lengths from the light source lamp 81 to respective liquid crystal panels, the blue light beam B is the longest, and hence luminous energy loss of this light beam is the largest. Nevertheless, by making the light guide system 927 intervene, the luminous energy loss can be suppressed.

Then, respective color light beams R, G, and B demodulated through respective liquid crystal light valves 925R, 925G, and 925B are poured to the prism unit 910 through the outgoing polarizing plates 961R, 961G, and 961B to be synthesized here. Furthermore, a color image synthesized by this prism unit 910 is projected through a projection lens unit 6 on a projection screen 100 in a predetermined location under magnification.

Figure 3A:
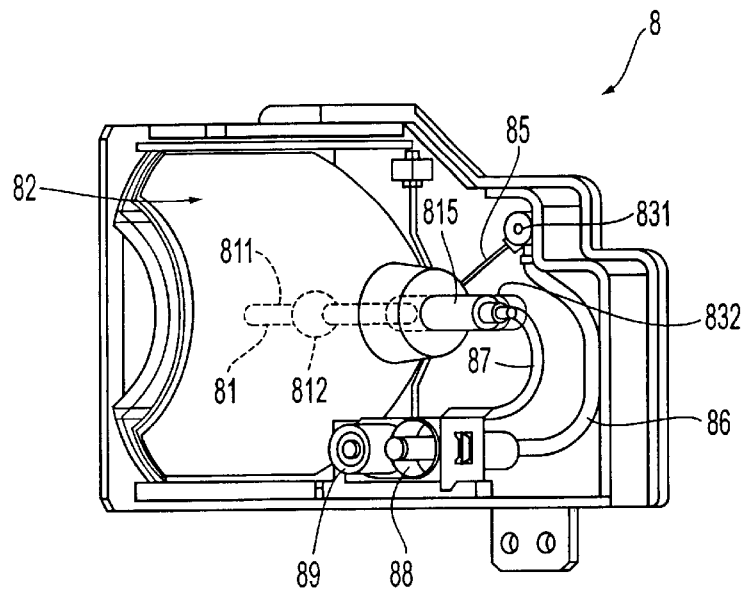
FIGS. 3(A) and 3(B) are schematic perspective views showing the structure of a light source lamp unit in the embodiment.
Figure 3B:
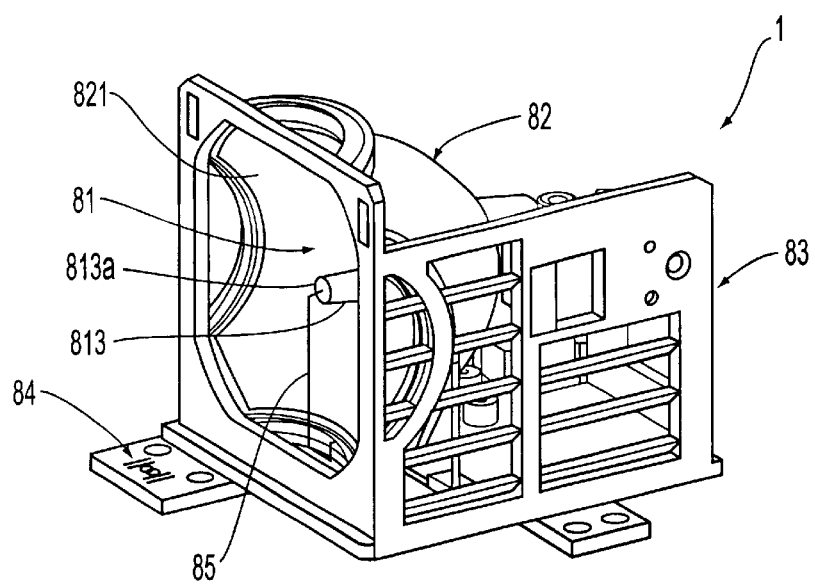

The light source lamp unit 8 described above, as shown in FIG. 3, comprises the light source lamp 81, a reflector 82 where this light source lamp 81 is mounted, a lamp housing 83 incorporating these light source lamp 81 and reflector 82, and a lamp information holder 84 provided in this lamp housing 83.

The light source lamp 81 is, for example, a metal halide lamp, and its emission tube 811 is made of silica glass. An emission part 812 formed in the center of the emission tube 811 has an elliptical shape near to a ball, electrode sealing parts 813 are formed in one piece in both sides of this emission part 812. Axles are located on the same axis inside the emission part 812. Ends of these axles of the electrodes face each other at a certain interval. The other ends of these axles of the electrodes are encapsulated respectively inside the electrode sealing parts 813.

The reflector 82 comprises a reflecting surface 821 having a parabolic crosssection, section, and a lamp mounting hole is formed in the center of the bottom of this reflecting surface 821. A base 815 of the light source lamp 81 in the above-described structure is inserted into this lamp mounting hole, and is fixed with high-temperature adhesive. In addition, the light source lamp 81 is mounted so that an axis of axles of its electrodes may be near to the central axis of the reflecting surface 821.

A nickel lead line 85 is connected to an end 813a of the electrode sealing part 813 described above, and extends downward with being bent at a right angle from the end 913a to be connected to a terminal block 831 for external connection, which is provided on a side end of a rear part of the lamp housing 83, from the bottom of the reflector 82. On the other hand, a terminal block 832 for external connection is provided at an end of the base 815. Lead lines 86 and 87 are connected to these terminal blocks 831 and 832, and other ends of these lead lines 85 and 86 are connected to connectors 88 and 89 for external power supply.

Figures 4A, 4B:
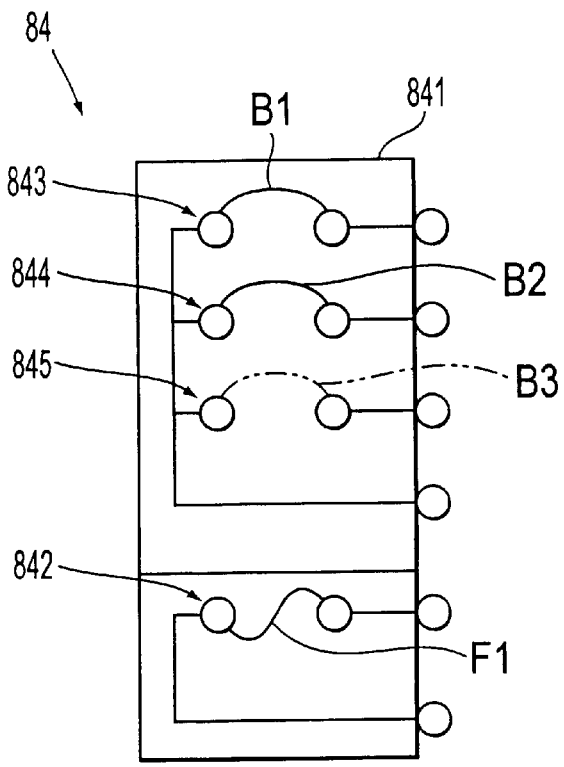
FIG. 4(A) is a top view showing the structure of a lamp information holder provided in a lamp guide of the light source lamp unit in the embodiment.
FIG. 4(B) is a table showing connection states of jumper wires.

The lamp information holder 84 provided in an end part of the lamp housing 83, as shown in FIG. 4(A), comprises a circuit board 841, a pair of fuse terminals 842, formed on a surface of this circuit board, and three pairs of jumper wire terminals 843 to 845. A fuse F1 is connected to the fuse terminals 842, and this fuse F1 is a part for holding the information expressing whether the light source lamp unit 8 is brand-new. Thus, when the light source lamp unit 8 is brand-new, the unit 8 is shipped in such a state that the fuse terminals 842 are connected to each other through the fuse F1. When the light source lamp 81 is turned on, the fuse F1 is melted by over-current flowing from a fuse melting circuit (omitted in FIG. 1) provides in the projection display apparatus 1. After melt of the fuse F1, since the fuse terminals 842 become electrically nonconductive, it is possible to recognize that the light source lamp unit 8 is not brand-new. The jumper wire terminals 843 to 845 are parts holding the information of the light source lamp 81 by connecting terminals with each other by using jumper wires B1, B2, and B3. It is possible to hold the information regarding wattage, the lifetime value of the lighting count, lifetime value of the operation time of the light source lamp 81 with connection states of the jumper wires B1, B2, and B3. Concretely, as shown in FIG. 4(B), it is possible to perform various setting with connection states of the jumper wires B1, B2, and B3.

Next, a judging procedure with the lamp information detection means 20 in the projection display apparatus 1 having the structure as described above will be described on the basis of the flowchart shown in FIG. 5.

(1) Confirm whether the light source lamp 81 is band-new by detecting a melting state of the fuse F1 (A1). If the light source lamp 81 is brand-new, set the lighting count at zero times and the operation time at zero hours by clearing the information regarding the lighting count and operation time of the light source lamp 81 recorded in the $E^2$PROM (A2). If the light source lamp 81 is not brand-new, obtain the information regarding the lighting count and operation time from the $E^2$PROM (A3).

(2) Next, although these are omitted in the flowchart, obtain the information regarding the lifetime of the lighting count and the lifetime of the operation time of the light source lamp 81 from the connection state of the jumper wires B1 to B3 that are connected to the jumper wire terminals 843 to 845 in the lamp information holder 84. Furthermore, calculate the replacement threshold of the lighting count and the replacement threshold of the operation time. Concretely, if the lifetime values are 2000 times and 2000 hours respectively, the replacement thresholds can be 1900 times and 1900 hours respectively.

(3) Compare the lighting count and lifetime value of the lighting count of the light source lamp 81, which are obtained, with each other (A4).

If the lighting count is larger than the lifetime value, lighting of the light source lamp 81 is regulated by the lighting inhibition means 60 even if the projection display apparatus 1 is turned on. In addition, a lifetime warning signal is output by the lifetime warning means 24 to the LED indicator 40, and computer 70 (A5). According to this lifetime warning signal, the LED indicator 40 blinks in red, and the display of the computer 70 displays a message, "Projection lamp expires. Immediately, replace the lamp.".

(4) On the other hand, if both of the operation time and lighting count are not larger than the lifetime values, turn on the light source lamp 81 (A6). In addition, not only lighting operation of the light source lamp 81 but also new lighting count, which is obtained by adding one to the lighting count obtained, are written in the lighting count recorder of the E²PROM. Although omitted in FIG. 5, if the value, obtained by adding one to the lighting count obtained, is equal to the lifetime value of the lighting count, a warning signal is issued from the lifetime warning means 24. Hence, the image display means 30 displays a message, "The lighting count reaches the lifetime value. Replace the projection lamp in the next lighting" on the projection screen.

(5) Next, compare the lighting count, which is obtained, with the replacement threshold of the lighting count (A7), and further compare the operation time, which is obtained, with the replacement threshold of the operation time (A8). If any one of the lighting count and operation time is larger than the replacement threshold, the replacement warning signal is output to the image display means 30, LED indicator 40, and computer 70 (A9). In addition, on the basis of this replacement warning signal, the LED indicator 40 blinks in red for a certain period of time, and at the same time, an image shown in FIG. 6 is displayed for a certain period of time on the project screen 100 by the image display means 30. After that, as shown in FIG. 7, the operation time and lighting count of the light source lamp 81, which is obtained, is displayed with the frequency, polarity, and mode of the synchronization signal S1, and the kind of source (signal mode).

Figure 5:
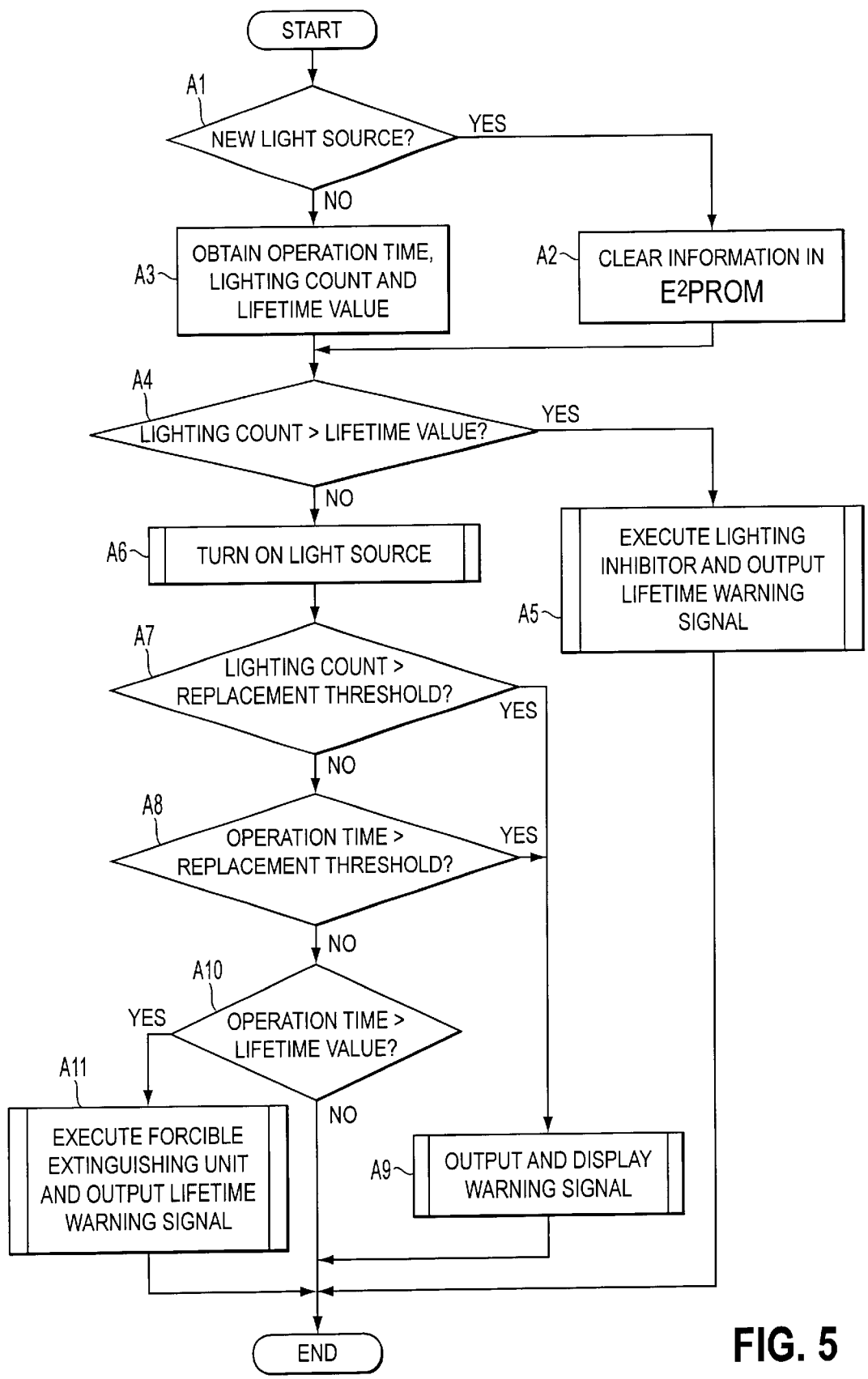
FIG. 5 is a flowchart showing the procedure of judging the operation time and lighting count of a light source lamp by the projection display apparatus in the embodiment.

(6) On the other hand, if both of the operation time and lighting count are not larger than the replacement thresholds, although omitted in FIG. 5, the replacement warning means 23 and lifetime warning means 24 detect the time of the light source lamp 81 since lighting with using an internal clock not shown. Furthermore, the means 23 and 24 check every constant period whether the accumulated operation time, which is obtained by adding this time to the operation time obtained, exceeds the replacement threshold, and further check every constant time whether the accumulated operation time exceeds the lifetime value (A10).

(7) If the accumulated operation time described above exceeds the replacement threshold, the warning signal is output and displayed by processing at step A9. In addition, if the accumulated operation time exceeds the lifetime value, the lifetime warning means 24 outputs the lifetime warning signal, and makes the forcible extinguishing means 50 execute operation for extinguishing the light source lamp 81 (A11). Concretely, the following operation is automatically performed: ①Extinguish the lamp; ② Indicate a blink signal in the LED indicator 40; ③ Cool down the lamp with a fan (omitted in FIG. 1) provided inside the apparatus. On the projection screen 100, the warning display is not displayed, but the information shown in FIG. 7 is displayed.

(8) On the other hand, if the extinguishing operation by the forcible extinguishing means is not performed during use of the image display apparatus 1 and the light source lamp 81 is extinguished by ordinarily turning off the apparatus, the accumulated operation time (operation time detected by the internal clock+operation time obtained beforehand) is written in the operation time recorder, and the image display apparatus 1 is turned off.

According to this embodiment as described above, the following effects can be obtained.

Thus, it is possible to further accurately grasp the actual lifetime of the light source lamp 81 built in the projection display apparatus 1 by detecting the lighting count affecting the lifetime of the light source lamp 81 since the projection display apparatus 1 comprises the lighting count detection means 21. Therefore, it is possible to use the light source lamp 81 in a proper state. In addition, since the apparatus 1 comprises the replacement warning means 23, it is possible to replace the light source lamp 81 before the forcible extinguishing means 50 operates because the operation time of the light source lamp 81 reaches the lifetime value. Hence, similarly, it is possible to use the light source lamp 81 in a proper state without brightness of the light source lamp 81 extremely dropping in use.

In addition, even if the light source lamp 81 was not replaced at the time of the replacement warning signal being displayed and the light source lamp 81 is used to the lifetime value thereafter, it is possible to prevent the light source lamp 81 from bursting and so forth by inhibiting the lighting of the light source lamp 81 by the lighting inhibition means 60 since the projection display apparatus 1 comprises the lighting inhibition means 60.

Furthermore, since the replacement warning means 23 is constructed in this manner, it is possible to judge the replacement timing of the light source lamp 81 from states of the lighting count and operation time, and hence it is possible to use the light source lamp 81 in a further proper state.

In addition, if the operation time reaches the lifetime value during lighting of the light source lamp 81, the light source lamp 81 is forcibly extinguished by the forcible extinguishing means 50 since the projection display apparatus 1 comprises the forcible extinguishing means 50.

Furthermore, since the display means for displaying the warning signal is the image display means 30, it is possible to grasp the information of the light source lamp 81 such as the lighting count and accumulated operation time as the actual values on the screen. Hence, it is possible for a user to use the projection display apparatus 1 with confirming the state of the light source lamp 81, and hence it is possible to use the light source lamp 81 in a further proper state.

Moreover, even if the projection display apparatus 1 is turned off, the record of the lighting count of the light source lamp 81 is held since the lighting count detection means 21 comprises the lighting count recorder and this lighting count recorder is composed of nonvolatile memory.

In addition, the present invention is not limited to the embodiment described above, but includes modification shown below. Furthermore, respective means can be configured with only the hardware, but can be realized with combining controls performed by hardware and software.

Thus, although, in the above-described embodiment, the projection display apparatus 1 displays the screen of the computer 70 on the projection screen 100, the present invention is not limited to this. Also in case of the composite signal S2 output from a video recorder, similar display can be performed. In case of the composite signal S2, the scene shown in FIG. 8 is displayed with the replacement warning signal.

In addition, although the above-described projection display apparatus 1 is constructed with including the liquid crystal light valves 925R, 925G, and 925B, the present invention is not limited to this, but, so long as a projection display apparatus comprises a light source lamp 81, the present invention can be applied. For example, the present invention can be also applied to a projection display apparatus comprising image display means using DMD (Deformable Mirror Display: "Electronic Display", Ohm Co., Ltd., pp. 291–292) or SSLM (Solid State Light Modulator) optical modulation means.

Furthermore, the lighting count recorder constructing the lighting count detection means 21 in the above-described embodiment and the operation time recorder constructing the operation time detection means 22 are composed of E²PROM. The present invention is not limited to this, but these recorders can be composed of EPROM, RAM, which is constructed so that power can be continuously supplied even if the projection display apparatus is turned off, and the like.

Others, that is, concrete structures, shapes, and the like at the time of implementation of the present invention can be other ones within a range where the object of the present invention can be achieved.

What is claimed is:

1. A projection display apparatus that forms an optical image corresponding to image information by optically processing a light beam emitted from a light source lamp and projects this optical image with a projection lens unit on a projection screen under magnification, comprising:

a lighting count detector that detects a lighting count of the light source lamp, wherein the lighting count is equal to a number of times that the light source lamp is turned on;

a replacement warning unit that outputs a warning signal, which urges a user to replace the light source lamp, in case where the lighting count detected by the lighting count detector reaches a predetermined value; and a display unit that displays at least one of the lighting count and the warning signal.

2. The projection display apparatus according to claim 1, further comprising:

a lighting inhibitor that inhibits the lighting of the light source lamp when the lighting count reaches a lifetime value set for the light source lamp.

3. The projection display apparatus according to claim 2, further comprising:

a lifetime warning unit that outputs on the display unit a warning signal that signals that the light source lamp has reached the lifetime value.

4. The projection display apparatus according to claim 3, further comprising:

an operation time detector that detects an operation time of the light source lamp.

5. The projection display apparatus according to claim 4, the replacement warning unit issuing the warning signal when any one of the lighting count detected by the lighting count detector, and the operation time detected by the operation time detector, reaches a predetermined value.

6. The projection display apparatus according to claim 5, the lighting count detector comprising a lighting count recorder that records the lighting count.

7. The projection display apparatus according to claim 6, the lighting count recorder comprising at least a portion of a nonvolatile memory.

8. The projection display apparatus according to claim 5, further comprising:

a forcible extinguishing unit that forcibly extinguishes the light source lamp when the operation time detected by the operation time detector reaches a lifetime value.

9. The projection display apparatus according to claims 3, the lighting count detector comprising a lighting count recorder that records the lighting count.

10. The projection display apparatus according to claim 9, the lighting count recorder comprising at least a portion of a nonvolatile memory.

11. The projection display apparatus according to claim 1, further comprising:

an operation time detector that detects an operation time of the light source lamp.

12. The projection display apparatus according to claim 11, the replacement warning unit issuing the warning signal when any one of the lighting count detected by the lighting count detector, and the operation time detected by the operation time detector, reaches a predetermined value.

13. The projection display apparatus according to claim 12, further comprising:

a forcible extinguishing unit that forcibly extinguishes the light source lamp when the operation time detected by the operation time detector reaches a lifetime value.

14. The projection display apparatus according to claim 13, the lighting count detector comprising a lighting count recorder that records the lighting count.

15. The projection display apparatus according to claim 14, the lighting count recorder comprising at least a portion of a nonvolatile memory.

16. The projection display apparatus according to claim 12, the lighting count detector comprising a lighting count recorder that records the lighting count.

17. The projection display apparatus according to claim 16, the lighting count recorder comprising at least a portion of a nonvolatile memory.

18. The projection display apparatus according to claim 1, the lighting count detector comprising a lighting count recorder that records the lighting count.

19. The projection display apparatus according to claim 18, the lighting count recorder comprising at least a portion of a nonvolatile memory.

20. The projection display apparatus according to claim 1, the display unit being an image display unit.

\* \* \* \* \*